US012711148B1

(12) United States Patent
Yamashita

(10) Patent No.: US 12,711,148 B1
(45) Date of Patent: Aug. 18, 2026

(54) SYSTEMS AND METHODS FOR STRUCTURING AND ANALYZING DATA

(71) Applicant: Copia Wealth Studios Inc., Carlsbad, CA (US)

(72) Inventor: Mark Yamashita, Toronto (CA)

(73) Assignee: Copia Wealth Studios Inc., Carlsbad, CA (US)

( * ) Notice: Subject to any disclaimer, the term of this patent is extended or adjusted under 35 U.S.C. 154(b) by 0 days.

(21) Appl. No.: 19/054,637

(22) Filed: Feb. 14, 2025

(51) Int. Cl.
*G06F 16/26* (2019.01)

(52) U.S. Cl.
CPC .................................... *G06F 16/26* (2019.01)

(58) Field of Classification Search
CPC ....................................................... G06F 16/26
See application file for complete search history.

(56) References Cited

U.S. PATENT DOCUMENTS 5,524,187 A * 6/1996 Feiner ..................... G06T 17/00 345/419
10,666,712 B1 * 5/2020 Dandekar ............... H04L 67/10
2003/0130894 A1 * 7/2003 Huettner ............ G06Q 30/0257 709/200
2007/0250439 A1 * 10/2007 Crocker ................ G06Q 40/03 705/38
2014/0188675 A1 * 7/2014 Brown .................. G06Q 40/12 705/30
2017/0169513 A1 * 6/2017 Perelman .............. G06Q 40/06
2021/0056629 A1 * 2/2021 Foley ..................... G06Q 40/04
2021/0382887 A1 * 12/2021 Tomlin ................. G06F 3/0484

* cited by examiner

*Primary Examiner* — Etienne P Leroux
(74) *Attorney, Agent, or Firm* — HG LAW LLP

(57) ABSTRACT

Systems and methods for structuring and analyzing data are described herein. Raw data based on a plurality of transactions may be received and structured into structured data based on a first data structure that defines one or more transactions. The first data structure may comprise a plurality of first sub-structures that each may include variables representing execution date, strike price, spot price, quantity, and transaction type for each transaction. The structured data may be compared with a plurality of templates. Each template may be defined by a second data structure comprising a plurality of second sub-structures that include a template type variable and transaction type sub-structures comprising variables representing a transaction type, quality, and strike price data. One or more templates most likely correlating to respective patterns reflected by the structured data are selected. Enriched data generated based on the structured data and identified templates is presented.

45 Claims, 7 Drawing Sheets

SYSTEMS AND METHODS FOR STRUCTURING AND ANALYZING DATA

FIELD OF INVENTION

Embodiments of the present disclosure relate to data structuring, processing, and organizing input data and generation of inferred data based on the input data.

SUMMARY

In accordance with some embodiments of systems and methods disclosed herein, a system for presenting enriched data is provided. The system may receive raw data based on a plurality of transactions. The raw data may be sourced from one or more disparate sources. The system may structure the raw data into structured data based on a first data structure. The first data structure may define one or more transactions. The first data structure may comprise a plurality of respective first sub-structures. The first sub-structures may further include an execution date variable, a strike price variable, a spot price variable, a quantity variable, a transaction type variable, any other suitable variable, or a combination thereof.

In some embodiments, the system compares the structured data with a plurality of templates. Each template may be defined by a second data structure. The second data structure may comprise a plurality of respective second sub-structures. The second sub-structures include a template type variable and one or more transaction type sub-structures. In some embodiments, the second sub-structure includes other variables, such as a volatility type variable, a time erosion variable, a risk variable, other suitable variables, or a combination thereof. Each transaction type sub-structure may include a transaction type variable, a quantity variable, a strike price data variable, any other suitable variable, or a combination thereof. For instance, the transaction type sub-structure may also include an expiration date variable, an underlying transaction asset variable, a relative strike price variable, or a premium paid variable.

In some embodiments, the system identifies one or more templates of the plurality of templates that most likely correlate to respective patterns reflected by the structured data. The system may generate enriched data based on the structured data and on the identified template or templates. The system may provide a presentation of the structured data with respect to at least one of the identified template or templates as well as at least some of the enriched data.

In some embodiments, the enriched data comprises interpolated data, projection data (e.g., indicating expected performance of the identified template or templates in the future), performance data (e.g., indicating a performance of respective strategies associated with the identified template or templates), comparative data (e.g., indicating a comparison of strategies associated with templates), any other suitable inferred data, or a combination thereof.

In some embodiments, the second data structure of a template further comprises one or more functions for generating the interpolated data, the projection data, the performance data, the comparative data, other suitable inferred data, or a combination thereof.

In some embodiments, the second data structure of a template may further comprise one or more functions for generating at least some of the enriched data.

In some embodiments, the presentation further includes providing a second presentation reflecting a strategy associated with another template that is different from the identified template or templates.

In some embodiments, each transaction is associated with a respective option transaction for an underlying asset.

In some embodiments, each of the identified template or templates is associated with a respective option position strategy. Each transaction type sub-structure for each of the identified templates may correspond to a respective option transaction, wherein each of the option transactions may be associated with the same underlying asset.

Although some of the examples describe using the systems and methods in the context of options trading, it is understood that the systems and methods described herein can be applied in any other suitable context.

BRIEF DESCRIPTION OF THE FIGURES

The present disclosure, in accordance with one or more various embodiments, is described in detail with reference to the following figures. The figures are provided for purposes of illustration only and merely depict typical or example embodiments. These figures are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
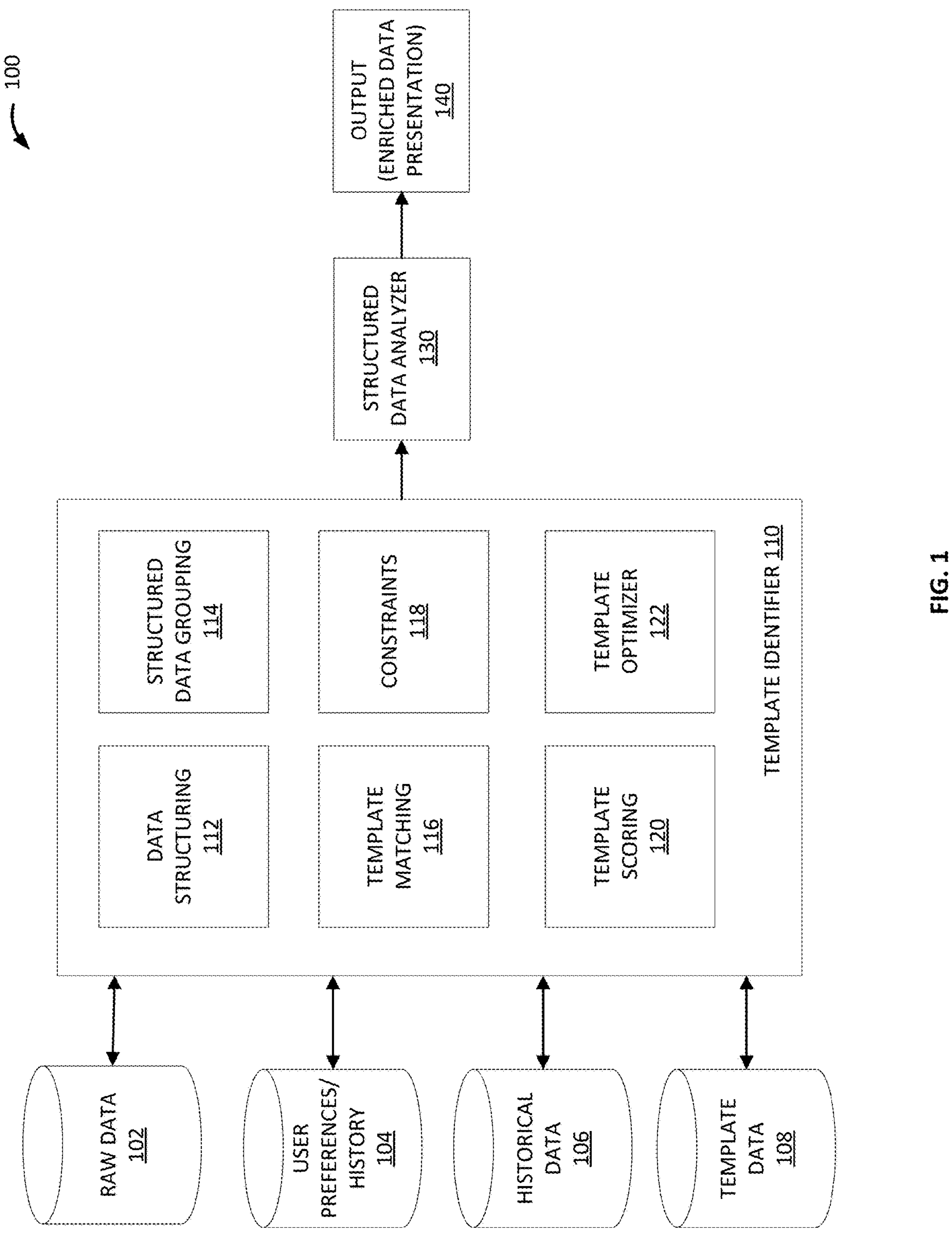
FIG. 1 shows an illustrative system for structuring and analyzing data, in accordance with an embodiment of the disclosure.

Systems and methods are provided herein for improved techniques for structuring and analyzing data. In some embodiments, a pattern detection system (PDS), which may be any suitable software, hardware, or both, is provided for implementing the features of the present disclosure. The PDS may be executed at least in part at client device 410, database 409, or server 408 of FIG. 4, one or more remote servers, distributed across any of one or more other suitable computing devices, in communication over any suitable type of network (e.g., internet), or a combination thereof.

When data is received from various disparate sources, the data may include different information, may be represented in different formats, some data may include information which is missing in other data, may be associated with other suitable disparate features, or a combination thereof. Such disparate qualities of the disparate data can make it difficult to interpret the data, detect patterns among the data, and analyze the data to infer meaningful information in an accurate and efficient manner. For example, the disparate data may be misrecognized or misinterpreted, resulting in misidentifying patterns in the data and inaccurate analysis of the data.

In some embodiments, the PDS is configurable to identify particular data patterns (e.g., templates) and to structure the received data to accommodate the particular patterns. The PDS may structure the data to accommodate predefined patterns, dynamically defined patterns, or both. For example, the PDS may receive raw options trading data, such as options transactions or other suitable data, associated with an investment portfolio. The options trading data for the portfolio may be provided from different sources, such as different financial institutions, brokerage accounts, trading platforms, or other suitable sources. As a result, the raw options trading data may include data that is unstructured, data that was previously structured or semi-structured according to particular formats (e.g., corresponding to the data source) or other foreign formats that are incompatible with each other, or a combination thereof. The PDS may define one or more particular data structures based on one or more particular templates, the context of the data, context of the data analysis, other suitable basis, or a combination thereof. For instance, a particular data structure may be defined to represent an options transaction. The PDS may format the raw options trading data according to the defined data structure.

In the example, the PDS may also define one or more templates based on various options strategies or other suitable patterns associated with one or more options transactions. For instance, one template may be defined to represent a bear put spread options strategy. Another template may be defined to represent an iron butterfly options strategy. Additionally, or alternatively, the PDS may group certain options transactions based on one or more parameters, detect a particular pattern associated with the group, and dynamically define a template based on the detected pattern.

In one instance, the PDS may group the options transactions based on the same underlying asset, irrespective of the raw data source, original format, or lack of format. The PDS may detect various patterns, or other suitable attributes, reflected by the group. The PDS may generate a list of possible options strategies that may correlate with these detected patterns. The PDS may score each options strategy based on one or more factors and select the options strategy with the highest score as the optimal options strategy. Additionally, or alternatively, the PDS may identify the optimal options strategy by removing candidate options strategies from the list based on applying one or more constraints.

Once the optimal options strategy is determined, the PDS may apply the strategy to the structured options transactions data to elicit other suitable additional information from the structured data, which allows the PDS to infer meaningful information. For instance, the PDS may determine that a pattern reflected by two options transactions (such as a long call strike and a short call strike) for the same underlying asset most likely correlates with a bull call spread options strategy. The PDS may perform a value at risk (VaR) analysis, or other suitable analysis, based on the bull call spread strategy and the structured transactions data. The PDS may provide for display the inferred results of the VaR analysis, the options transactions data, or both, as enriched data, by way of any suitable user interface (UI).

Although the example describes the implementation of the PDS in an options trading context, it is understood that the systems and methods described herein can be applied in any other suitable context.

A benefit of the described systems and methods includes structuring data that is received from disparate sources to efficiently and accurately interpret the data in meaningful ways. Another benefit includes structuring templates for recognizing meaningful patterns in the accurately interpreted data and performing accurate analysis of the data.

FIG. 1 shows an illustrative system 100 for structuring and analyzing data, in accordance with an embodiment of the disclosure. The PDS of the present disclosure may include, for example, the system 100 or various subsystems or components thereof. For example, the PDS may include data stores 102, 104, 106, 108, template identifier 110, structured data analyzer 130, and output 140. Template identifier 110 may further comprise a data structuring component 112, grouping component 114, template matching component 116, constraints 118, template scoring component 120, and template optimizer 122. Although examples in the disclosure describe structuring options trading data and detecting options strategies, it is understood that these examples are for illustrative purposes and that the systems and methods described may be applied to other suitable contexts.

According to an embodiment, raw data store 102 is configurable to store raw data from one or more sources. Raw data may include unstructured or unformatted data, or data that has been structured or semi-structured according to a foreign format or incompatible formats. Raw data may be obtained from various sources. For instance, raw options trading data for a particular investment portfolio may include buys, sells, exercises, or other suitable transactions (e.g., trading positions or other holdings) that come from different financial institutions, brokerage platforms, trading platforms, or other suitable sources. The raw options trading data may also include various details about an option, such as expiry date, strike price, type of option (e.g., call or put), or other suitable attributes. Raw data may also include metadata associated with each transaction (e.g., when an option was purchased, the platform through which it was purchased).

According to an embodiment, user preferences and history data store 104 is configurable to store data associated with user profile data, user preferences data, and user history data. For instance, user profile and preference data may include trading or trading strategy preferences, risk tolerance, risk exposure, or other suitable information of an account owner or entity associated with the investment portfolio. Examples of user history data may include past trades, positions, or holdings associated with the investment portfolio, past options strategies implemented for the portfolio, or other suitable historical activity associated with the user profile. User preferences and history may be determined based on various factors, such as historical user actions or behaviors, data provided directly or indirectly from the user, or based on other suitable user data.

According to an embodiment, historical data store 106 is configurable to store historical data or general data relevant to the context of the raw data. For instance, historic data relevant to options trading may include historical or general market data (e.g., past prices, historical volatility of a security), or other suitable historical information. In some examples, historical data may include historical activity of a particular population, such as historical options trades by multiple investors associated with a particular platform, popularity of options strategies previously implemented by investors of a platform, or other suitable historical information.

According to an embodiment, template data store 108 is configurable to store template data, such as template data structures. For instance, template data store 108 may include data structures representing various options strategies, or other suitable patterns.

Figures 2A, 2B:
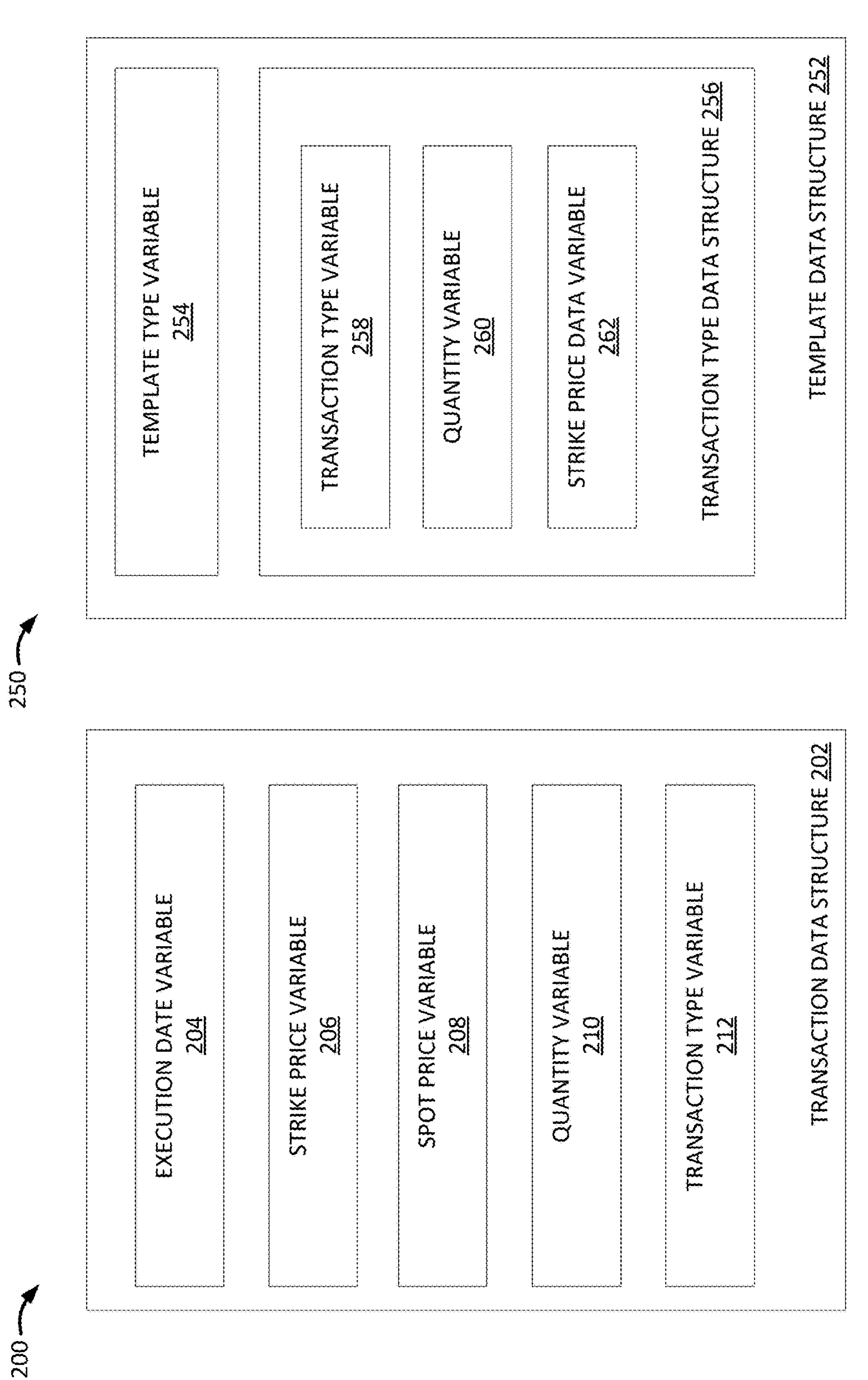
FIGS. 2A and 2B show illustrative data structures for structuring data and templates, respectively, in accordance with an embodiment of the disclosure.

According to an embodiment, data structuring component 112 is configurable to structure the raw data according to a defined data structure. An example data structure is illustrated in FIG. 2A. For example, the PDS may, by way of data structuring component 112, define a transaction data structure 202 comprising an execution date variable 204, strike price variable 206, spot price variable 208, quantity variable 210, transaction type variable 212, any other suitable variable (such as, for instance, expiration date variable, underlying transaction asset variable, relative strike price variable, or premium paid variable), or a combination thereof. For instance, the PDS may receive raw options trading data (e.g., buys, sells, or exercises associated with various options) for an investment portfolio from various trading platforms. The PDS may structure the data of each trade (e.g., options transaction) according to the transaction data structure 202. In some instances, the execution date variable 204 of a trade may comprise the date the option is exercised. Additionally, or alternatively, the execution date variable 204 of a trade may comprise the date the option expires (e.g., if the option is not exercised). In some instances, the spot price may be the current market price of the underlying asset. In some instances, the spot price may be the market price of the underlying asset at the time the option was bought. It will be understood that FIG. 2A is merely illustrative of one particular way in which a data structure for structuring raw data may be defined. Any other suitable data structures may be used.

According to an embodiment, grouping component 114 is configurable to group the structured transactions based on one or more parameters. For example, the PDS may, by way of grouping component 114, group the options transactions by underlying asset. For instance, in a given set of options transactions, the PDS may identify a subset of four transactions that are all based on the same underlying asset: (1) a long put option transaction with a spot price of $80, expiring on Nov. 28, 2024; (2) a short put option transaction with a spot price of $90, expiring on Nov. 28, 2024; (3) a short call option transaction with a spot price of $90, expiring on Nov. 28, 2024; and (4) a long call option transaction with a spot price of $100, expiring on Nov. 28, 2024.

Additionally, or alternatively, in some embodiments, a grouping parameter is based on one or more templates. For example, templates for some options strategies may be defined to include multiple options that share the same spot price or a certain combination or sequence of options. For instance, instead of a subset of the above four transactions, the PDS may group a subset of two transactions (e.g., the long call option and the long put option) based on options strategies having a particular combination of long call and long put options (e.g., a long straddle strategy and a long strangle strategy).

According to an embodiment, template matching component 116 is configurable to detect one or more patterns reflected by the structure data (e.g., the group of options transactions) and identify one or more possible templates (e.g., an options strategy, or other suitable pattern) that likely correlate with the pattern reflected by the structured data. For example, the PDS may, by way of template matching component 116, detect that the aforementioned group of four transactions may be associated with the same or similar (e.g., within a certain range of each other) expiration date, implied volatility (e.g., the magnitude of change in price of the underlying asset in a given time window; whether the combination of the transactions helps or hurts the investor's position), reward (e.g., limited or unlimited potential profit), risk (e.g., limited or unlimited loss), market outlook (e.g., large move in either direction), time erosion (e.g., decline in value of the option over time, or whether the decline in value helps or hurts the investor's position), any other suitable variable, or a combination thereof. Such patterns may be indicative of multiple options strategies, such as a long straddle, a long strangle, or an iron butterfly. Additionally, or alternatively, the PDS may detect a pattern based on specific types of differences or changes in one or more variables between the transactions. For example, in a group of transactions for the same underlying asset, a number of put options may have been purchased at a first strike price and the same number of put options may be sold at a second strike price lower than the first strike price, which may be reflective of a pattern correlating to a bear put spread options strategy.

The PDS may define each template based on a template data structure. An example template data structure 252 is illustrated in FIG. 2B. An example pseudocode associated with example template data structure 252 is shown below, according to some embodiments.

```
"long_straddle":{
  "name":"Long Straddle",
  "type":"volatility",
  "components": [
    {
      "option_type":"long_call",
      "quantity": 1,
      "relative strike": 0
    },
    {
      "option_type":"long_put",
      "quantity": 1,
      "relative strike": 0
    }
  ]
}
```

Another example pseudocode associated with example template data structure 252 is shown below, according to some embodiments.

```
"long_straddle":{
  "name":"Long Straddle",
  "type":"volatility",
  "components": [
    {
      "option_type":"long_call",
      "quantity": 1,
      "relative strike": 0
    },
    {
      "option_type":"long_put",
      "quantity": 1,
      "relative strike": 0
    }
  ]
}
```

As shown in FIG. 2B, the PDS may define a template data structure 252 comprising a template type variable 254, one or more transaction type data structures 256, any other suitable variable (such as, for instance, a template time erosion variable or a volatility relationship variable), or a combination thereof. In some embodiments, a respective template data structure 252 corresponds to a different options strategy. In some embodiments, the transaction type data structure 256 corresponds with transaction data structure 202 of FIG. 2A (e.g., an option transaction). In some embodiments, the template time erosion variable indicates whether time erosion helps or hurts the investor's position using the particular options strategy. In some embodiments, the volatility relationship variable indicates whether increased volatility helps or hurts the investor's position using the particular options strategy. In some embodiments, the template data structure 252 comprises one or more functions for generating interpolated data, projection data, performance data, comparative data, other suitable inferred data, or the enriched data. For instance, such inferred data may be generated by selecting a template that optimally matches a pattern detected from the structured data and applying the one or more functions to the structured data.

Each transaction type data structure 256 may further comprise a transaction type variable 258 (e.g., an option type), quantity variable 260, strike price data variable 262, any other suitable variable (such as, for instance, a volatility type variable, a time erosion variable, or a risk variable for a particular option), or a combination thereof. In some embodiments, the strike price data variable 262 indicates a relationship (e.g., relative strike price) between the strike price variables of each option in the options strategy. Additionally, or alternatively, in some embodiments, the strike price data variable incorporates the spot price of the underlying asset. In some embodiments, the time erosion variable for the particular option represents a decline in value of the option over time, whether the decline in value of that option helps or hurts the investor's position, or both.

For instance, a long straddle options strategy may comprise a combination of a long call option and a long put option, both having the same strike price. A template data structure 252 for a long straddle options strategy(e.g., line 1 of the pseudocode) may comprise a template type variable 254 indicating a long straddle strategy type (e.g., line 2 of the pseudocode) and multiple transaction type data structures 256 comprising a long call option (e.g., lines 6-8 of the pseudocode) and a long put option (e.g., lines 11-13 of the pseudocode). The long call option may further comprise a transaction type variable 258 indicating that it is a long call option (e.g., line 6 of the pseudocode), a quantity variable 260 indicating the number of long call options purchased (e.g., line 7 of the pseudocode), and a strike price data variable 262 (e.g., relative strike price of 0) indicating that the strike price of the long call option is the same as the strike price of the long put option (e.g., line 8 of the pseudocode). The long put option may further comprise a transaction type variable 258 indicating that it is a long put option (e.g., line 11 of the pseudocode), a quantity variable 260 indicating the number of long put options purchased (e.g., line 12 of the pseudocode), and a strike price data variable 262 with a value of 0 (e.g., line 13 of the pseudocode).

In another instance, a long strangle options strategy may comprise a combination of a long call option and a long put option, wherein the long call strike price is higher than the long put strike price. A template data structure 252 for the long strangle options strategy (e.g., line 17 of the pseudocode) may comprise a template type variable 254 indicating a long strangle options strategy type (e.g., line 18 of the pseudocode) and multiple transaction type data structure 256 comprising a long call option (e.g., lines 22-24 of the pseudocode) and a long put option (e.g., lines 27-29 of the pseudocode). Unlike that for a long straddle options strategy, the long call option in the long strangle options strategy may comprise a strike price data variable 262 having a relative strike price of 1 (e.g., line 24 of the pseudocode) while the long put option in the long strangle options strategy may comprise a strike price data variable 262 having a relative strike price of −1 (e.g., line 29 of the pseudocode).

It will be understood that FIG. 2B and the example pseudocode are merely illustrative of one particular way in which a data structure for a template may be defined. Any other suitable data structures may be used.

In some embodiments, the PDS, by way of template matching component 116, identifies the possible templates (e.g., candidate templates) that correlate with the pattern or patterns reflected by the structured data, for instance, by comparing and determining similar patterns between the templates and the structured data. In some embodiments, the templates may be predefined. In the example, the PDS may determine that the predefined templates corresponding to a long straddle, long strangle, iron butterfly, and bear put spread are candidate options strategies that correlate with the pattern reflected by the example four options transactions. Each of these strategies has a particular combination of options that are similar to those in the group of options transactions (for instance, a combination of long call and long put, or a combination of long put and short put).

Additionally, or alternatively, the templates may be dynamically defined. For instance, the PDS may detect a particular pattern in the structured data that does not fit any predefined template. In some embodiments, the PDS uses one or more deterministic techniques for detecting patterns, based on one or more attributes or parameters of the structured data, raw data, or both. For instance, the PDS may determine patterns based on temporal data associated with or included in the options trading data. In some examples, the PDS may use any suitable machine learning models to detect patterns dynamically. The PDS may determine various correlations within the raw data, the structured data, or both. For instance, the PDS may determine that one or more options exhibit high cohesion or are tightly coupled based on similar or identical characteristics of those options. In some instances, the PDS may dynamically combine multiple different predefined templates into a hybrid template. In some instances, the PDS may dynamically define a template by modifying one or more parameters of a predefined template, such as modifying the strike price relationship, hedging strategy type, or time window of a predefined options strategy.

The PDS may define a new template with specific parameters based on the detected pattern. In some embodiments, the PDS may modify any template (predefined or dynamic) based on other patterns detected in the structured data According to an embodiment, scoring component 120 is configurable to score the candidate templates based on combining various scores for one or more factors, such as prevalence of the strategy, preference for the strategy, probability of intent to implement the strategy, likelihood that the strategy matches the pattern of the structured data, any other suitable factor, or a combination thereof. The higher the overall score, the more likely the candidate template may accurately reflect the pattern detected in the structured data. In some embodiments, the PDS ranks the candidate templates by score and select one or more templates with the highest score or scores. In some embodiments, the PDS selects the template or templates having a score above a particular threshold.

For example, the PDS may calculate and assign a score to each candidate template based on overall prevalence (e.g., frequency or popularity) of the particular options strategy based on historic or general information. The PDS may score the templates based on preference for the particular strategy based on past trading behavior (e.g., of the investor, other investors, or both).

The PDS may score the templates based on a probability of an intent (e.g., by the investor or other entity that purchased the group of options transactions) to implement a particular strategy of each template. The probability of intent may be determined based on, for instance, metadata associated with each options transaction (e.g., same or different purchase times, purchase platform, premium paid using the same or different accounts), or other suitable data.

The PDS may score the templates based on a likelihood of each strategy matching the detected pattern. The likelihood may be based on, for instance, intrinsic characteristics of the options strategy and how logical, closely matching, or appropriate (e.g., least unusual or least conflicting) each intrinsic characteristic is with respect to the structured data. Example intrinsic characteristics may include the spread size of a particular options strategy, the time window of the spread, or other suitable characteristics. For instance, if a candidate template is associated with a spread of an unusually large amount (e.g., $100) with respect to the qualities (e.g., historical market data) of the underlying asset, the PDS may determine that the candidate template is an unusual options trading strategy for the types of options transactions in the structured data and assign the template a lower intrinsic characteristic score. In some examples, the likelihood may increase based on the number of intrinsic characteristics, the type of intrinsic characteristics, or both, that are congruent between the candidate template and the pattern detected in the structured data. In the example group of four transactions, a pattern reflected by two of the options transactions may have at least two intrinsic characteristics in common with the long straddle or long strangle strategy (e.g., combination of option types and relative strike price, depending on whether the strike prices are the same or different). However, the pattern reflected by all four transactions may share at least five intrinsic characteristics with those of an iron butterfly strategy(e.g., combination of option types, relative strike price, spot price, implied volatility, and time erosion).

According to an embodiment, the PDS may apply constraints 118 to the candidate templates and remove candidate templates from final selection based on one or more factors. For example, a constraint may include a uniqueness constraint, such as restricting a particular option transaction from existing in two or more selected options strategies. For instance, if a group of 20 options transactions can be reflected by 10 different candidate options strategies, but there is overlap in the options among the candidate strategies, then the strategies that have the duplicate options may be removed from the final selection. This prevents errors in template identification and data inferencing that may otherwise result from having a single option transaction that corresponds to multiple strategies. In another example, a constraint may be a user preference against a particular options strategy, or other suitable restriction may be applied to the templates. For instance, an investor may indicate, via user input, that a particular option strategy is inaccurate, irrelevant, or not associated with an original intent associated with the options transactions. The PDS may restrict future selection of the particular option strategy. The PDS may also update the user preferences and history data based on this user input. In some embodiments, the PDS may identify a candidate options strategy that would be commonly applied to options having the characteristics of the structured options transactions (e.g., previously or frequently implemented by the portfolio, on a particular trading platform, by a certain group of investors, or a combination thereof). Various parameters of the template data structure (such as strike price relationships, strategy type such as hedging strategies, or time window) may be used to further identify these common candidate options strategies. The PDS remove these common candidate options strategies from final selection, in favor of other options strategies (e.g., less common, more complex, hybrid of multiple predefined strategies, or a combination thereof).

According to an embodiment, template optimizer 122 is configurable to optimize the selection of the one or more templates that most likely correlate with the pattern or patterns reflected by the structured data. For instance, the PDS may, by way of template optimizer 122, maximize the respective sum of scores for the candidate templates, remove one or more templates from the candidate set by applying one or more constraints to the candidate set, and select the remaining options strategy or strategies with the highest score or scores.

According to an embodiment, structured data analyzer 130 is configurable to apply the selected template or templates to the structured data to generate enriched data. In some embodiments, the PDS, by way of structured data analyzer 130, generates the enriched data by applying one or more models or functions (e.g., value at risk (VaR) model or other suitable analysis model) to the selected templates and structured data. In some embodiments, the selected template or templates comprise one or more of these functions that the PDS applies to the structured data to generate the enriched data. In some embodiments, the enriched data comprises interpolated data, projection data (e.g., indicating expected performance of respective strategies associated with the selected one or more templates), comparative data (e.g., indicating a comparison of strategies between the selected templates), any other suitable inferred data, or a combination thereof. The enriched data may be provided as output 140 (e.g., presented in any suitable manner, such as by way of any suitable UI).

For example, applying the correct or optimal option trading strategies to the structured data allows the PDS to perform an accurate VaR analysis, or other suitable analysis, of the structured data. For instance, applying the VaR model to an options strategy that sub-optimally or inaccurately matches the pattern reflected by the structured data may result in a significantly higher risk profile and inaccurate VaR estimates than would the application of the VaR model to an options strategy that optimally matches the patterns in the structured data. Inaccurate VaR estimates and risk profiling may result in processing inefficiencies and excess consumption of computing resources when performing proper compliance reporting during audits.

In some embodiments, the PDS performs analysis of the structured data based on one or more templates (e.g., predefined or dynamically defined) that have patterns that are not reflected by the structured data, for instance, to make alternative projections or other suitable inferences. For example, the PDS may apply a particular options strategy (e.g., that was assigned a low score) to the structured data to infer the alternative qualities the investment portfolio may have if the options transactions were purchased according to a different date and time pattern (e.g., every Tuesday morning as opposed to every Wednesday afternoon).

Figure 3:
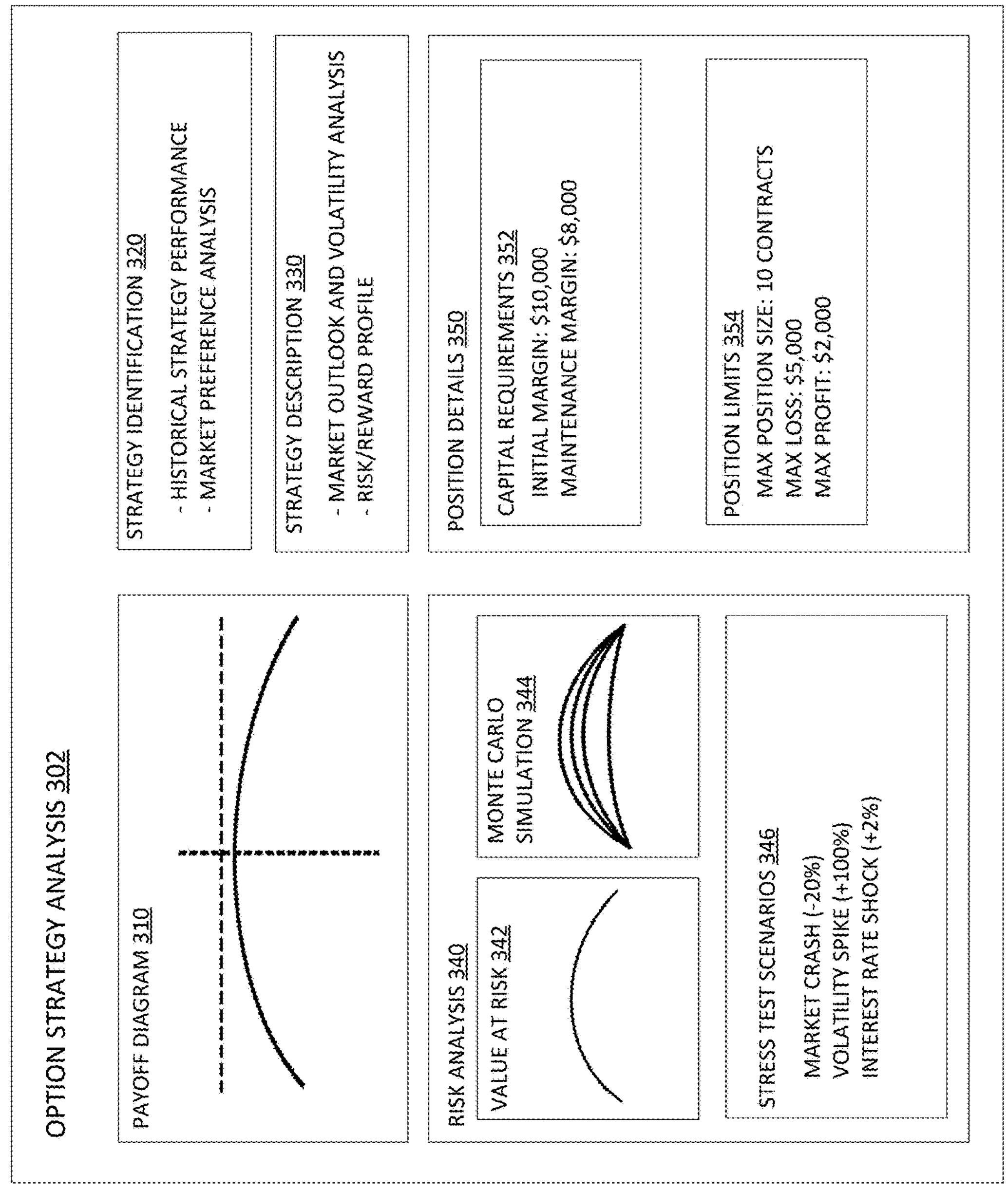
FIG. 3 shows an illustrative graphical user interface (GUI) for presenting enriched data, in accordance with an embodiment of the disclosure.

FIG. 3 shows an illustrative GUI 300 for presenting enriched data, in accordance with an embodiment of the disclosure. In the example, GUI 300 may comprise a display of an option strategy analysis 302 based on options transaction data and options trading strategies that correlate with the patterns reflected in the options transactions. In the example, enriched data may comprise payoff data and may be presented as payoff diagram 310. An example pseudocode associated with generating the payoff diagram 310 is shown below, according to some embodiments. It will be understood that FIG. 3 and the example pseudocode are merely illustrative of one particular way and context in which enriched data may be presented. Any other suitable presentations may be implemented and in any suitable context.

```
import numpy as np
import pandas as pd
import matplotlib.pyplot as plt
def calculate_option_payoff(spot_range, strike, premium, option_type, position=‘long’):
""
Calculate the payoff for a single option position
Parameters:
spot_range: array of possible stock prices
strike: strike price of the option
premium: option premium paid/received
option_type: ‘call’ or ‘put’
position: ‘long’ or ‘short’
"""
multiplier=1 if position==‘long’ else−1
if option_type.lower( )==‘call’:
payoff=np.maximum(spot_range−strike, 0)
else: # put
payoff=np.maximum(strike−spot_range, 0)
return multiplier*(payoff−premium)

def plot_option_strategy(options_list, spot price, margin=0.5):
"""
Plot payoff diagram for multiple options

Parameters:
options_list: list of dictionaries containing option parameters
spot price: current price of underlying
margin: percentage above and below spot price to plot
"""
# Generate price range
lower_bound=spot_price*(1−margin)
upper_bound=spot_price*(1+margin)
spot_range=np.linspace(lower_bound, upper_bound, 200)

# Calculate total payoff
total_payoff=np.zeros_like(spot_range)

# Plot individual option payoffs
plt.figure(figsize=(10, 6))

for option in options_list:
payoff=calculate_option_payoff
spot_range,
option[‘strike’],
option[‘premium’],
option[‘type’],
option[‘position’]
)
total_payoff+=payoff

# Plot individual option payoff
plt.plot(spot_range, payoff, ‘—’, label-f “{option[‘position’]} {option[‘type’]} K={option[‘strike’]}”)

# Plot total payoff
plt.plot(spot_range, total_payoff, ‘b-’, linewidth=2, label=‘Total Payoff’)

# Add features to plot
plt.axhline(y=0, color=‘k’, linestyle=‘-’, alpha=0.3)
plt.axvline(x=spot_price, color=‘g’, linestyle=‘—’, alpha=0.3, label=‘Current Price’)
plt.grid(True, alpha=0.3)
plt.xlabel(‘Stock Price’)
plt.ylabel(‘Profit/Loss’)
plt.title(‘Option Strategy Payoff Diagram’)
plt.legend( )

return plt
# Example usage
example_options=[

{‘type’: ‘put’, ‘strike’: 80, ‘premium’: 2, ‘position’: ‘long’},
{‘type’: ‘call’, ‘strike’: 100, ‘premium’: 2, ‘position’: ‘long’}
]

spot_price=90
plt=plot_option_strategy(example_options, spot_price)
plt.show( )
```

In some embodiments, GUI 300 comprises presentation of raw data, structured data, identified templates, data based on analyzing one or more of the aforementioned information, or a combination thereof. For example, presentation of option strategy analysis 302 may comprise payoff diagram 310, strategy identification 320, strategy description 330, risk analysis 340, position details 350, other suitable data, or a combination thereof.

In some embodiments, position details 350 comprises options transactions data or user profile data, such as capital requirements 352 (e.g., initial margin and maintenance margin) and position limits 354 (e.g., maximum position size or number of options contracts, maximum loss, and maximum profit), or other suitable data associated with the investment portfolio.

In some embodiments, strategy identification 320 comprises data associated with identification or selection of one or more options strategies correlating with patterns in the options transactions. For instance, strategy identification 320 may include historical strategy performance (e.g., strategies previously used in the investment portfolio), market preference analysis (e.g., popular or commonly used strategies by a certain investor or investment platform), or other suitable information.

In some embodiments, strategy description 330 comprises data describing the identified strategies with respect to any suitable data, such as the options transactions data or user profile data (e.g., investment portfolio data). For instance, strategy description 330 may include market outlook and volatility analysis and risk or reward profile associated with the investment portfolio.

In some embodiments, payoff diagram 310 and risk analysis 340 comprise graphical representations of analysis based on the options transaction data and the identified options strategy or strategies. For example, the PDS may analyze the options transactions data using the identified options strategy to determine the risk and reward associated with the options strategy with respect to the options transactions. The PDS may calculate the payoff for each option transaction (e.g., lines 4-21 of the pseudocode). The PDS may sum the payoffs of the options transactions into a payoff for the overall options strategy(e.g., lines 23-54 of the pseudocode) and render the data in the payoff diagram 310 (e.g., lines 56-78 of the pseudocode).

In the example, the PDS may perform various risk analysis and simulations based on the options transaction data and the identified options strategy. For instance, the PDS may render data based on VaR analysis 342, Monte Carlo Simulation 344, stress test scenarios 346 (e.g., simulating market crash, volatility spike, interest rate shock), or other suitable simulations.

Figure 4:
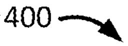
FIG. 4 shows an illustrative network environment for a system for structuring and analyzing data, in accordance with an embodiment of the disclosure.
Figure 4:
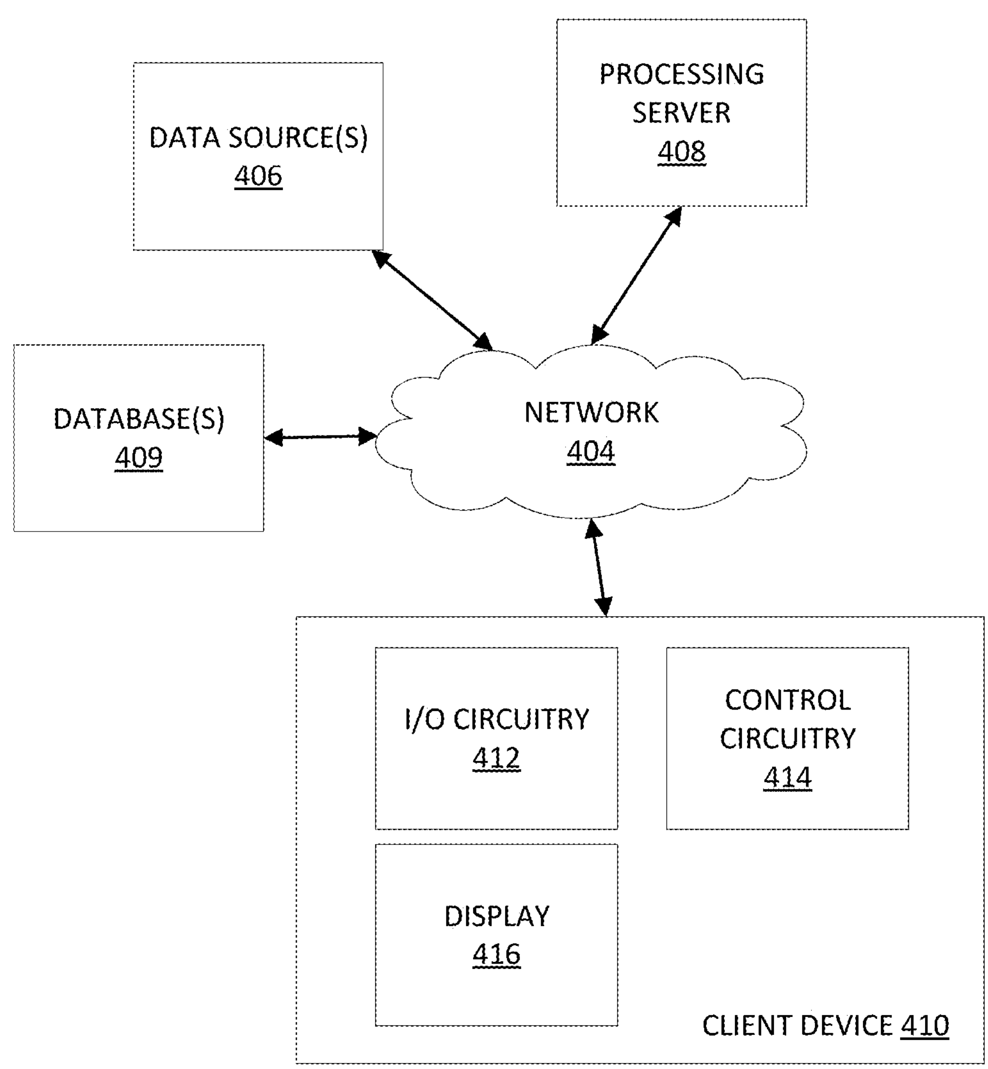

FIG. 4 shows an illustrative network environment 400 for a system for structuring and analyzing data, in accordance with an embodiment of the disclosure. The network environment may comprise client device 410 (further comprising input/output circuitry 412, control circuitry 414, and display 416), processing server 408, one or more data sources 406, and one or more databases 409. In some embodiments, the PDS may be executed at least in part at or by any one or a combination of components illustrated in the environment 400, including client device 410, processing server 408, or both. Control circuitry 414 of client device 410 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units.

Figure 5:
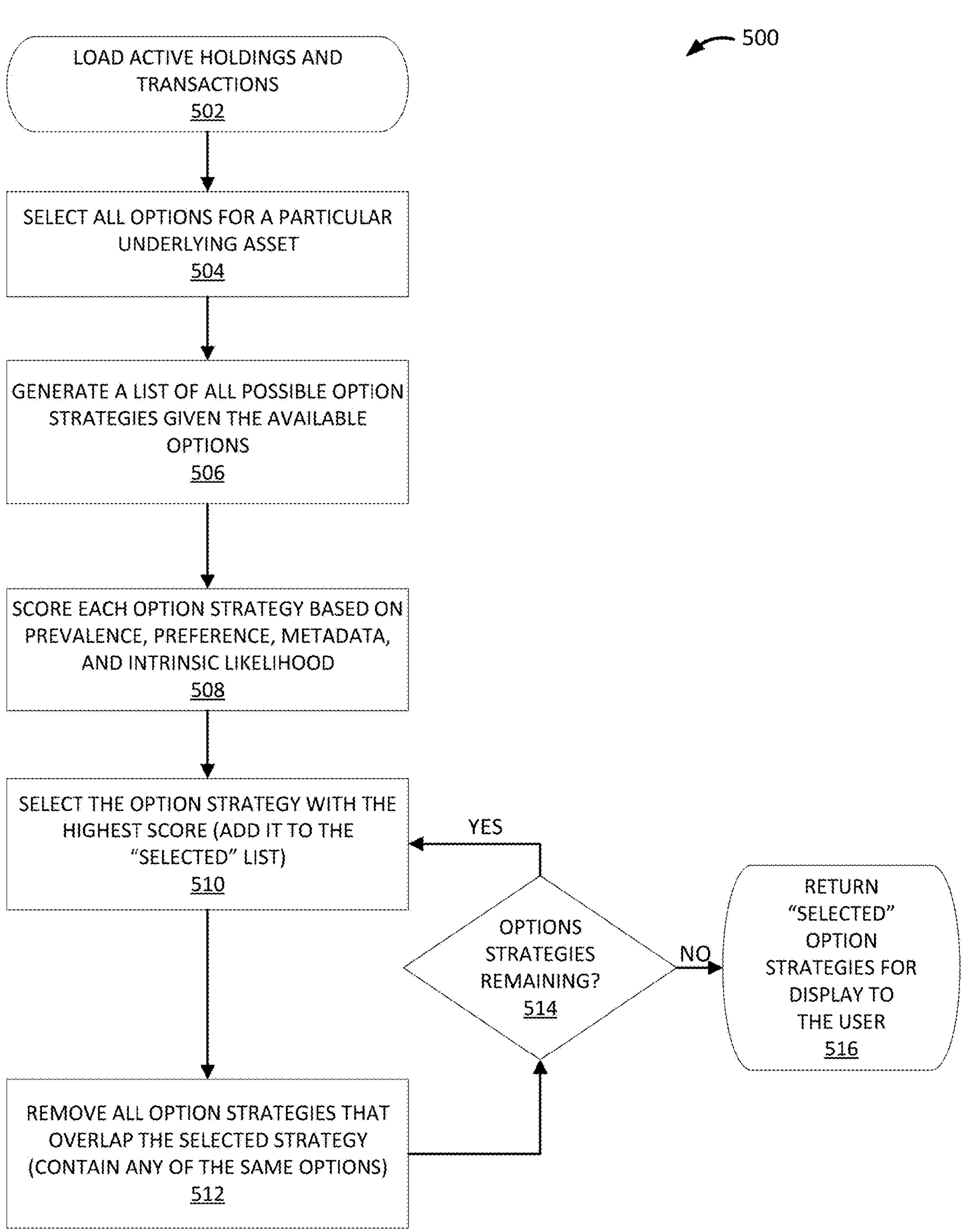
FIG. 5 shows a flowchart of an illustrative process for structuring and analyzing data, in accordance with an embodiment of the disclosure.
Figure 6:
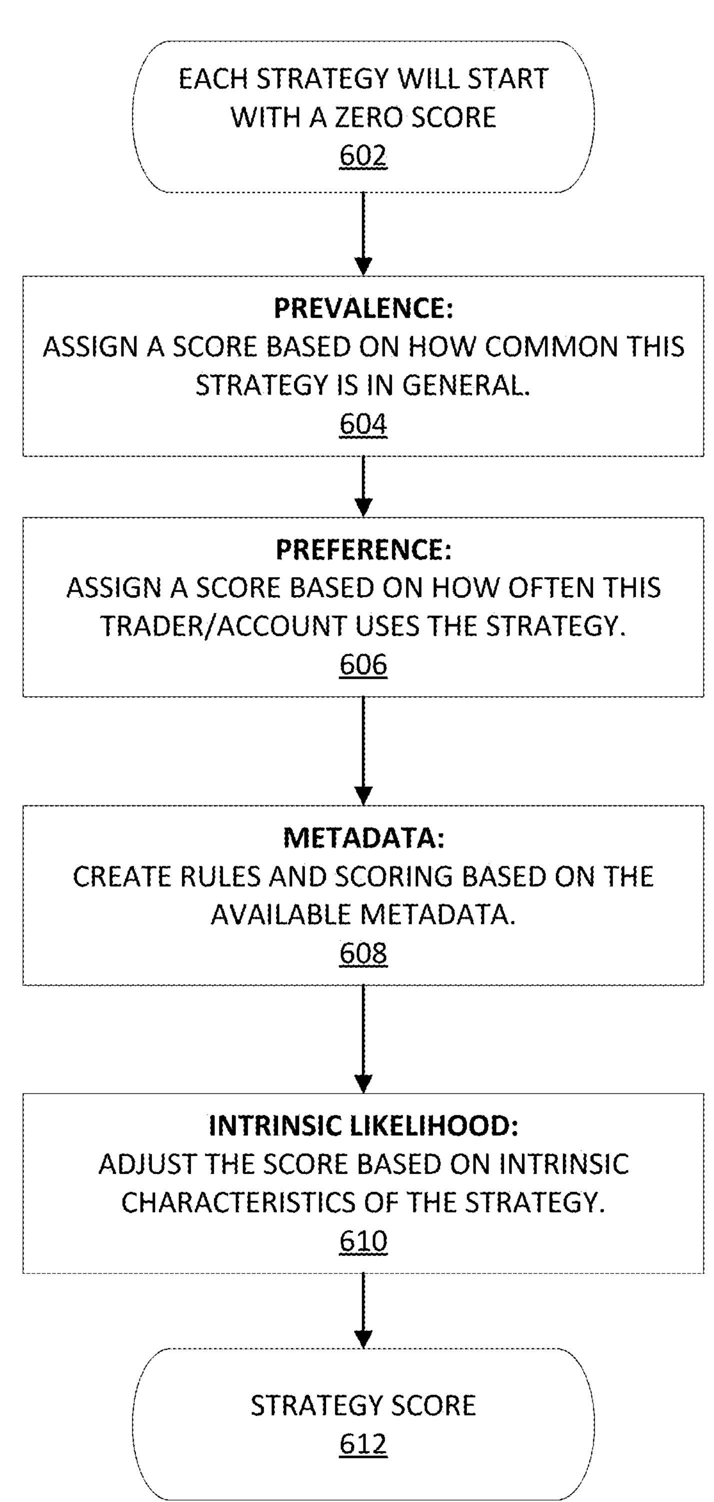
FIG. 6 shows flowchart of an illustrative process for optimizing template identification for structured data, in accordance with an embodiment of the disclosure.
Figure 7:
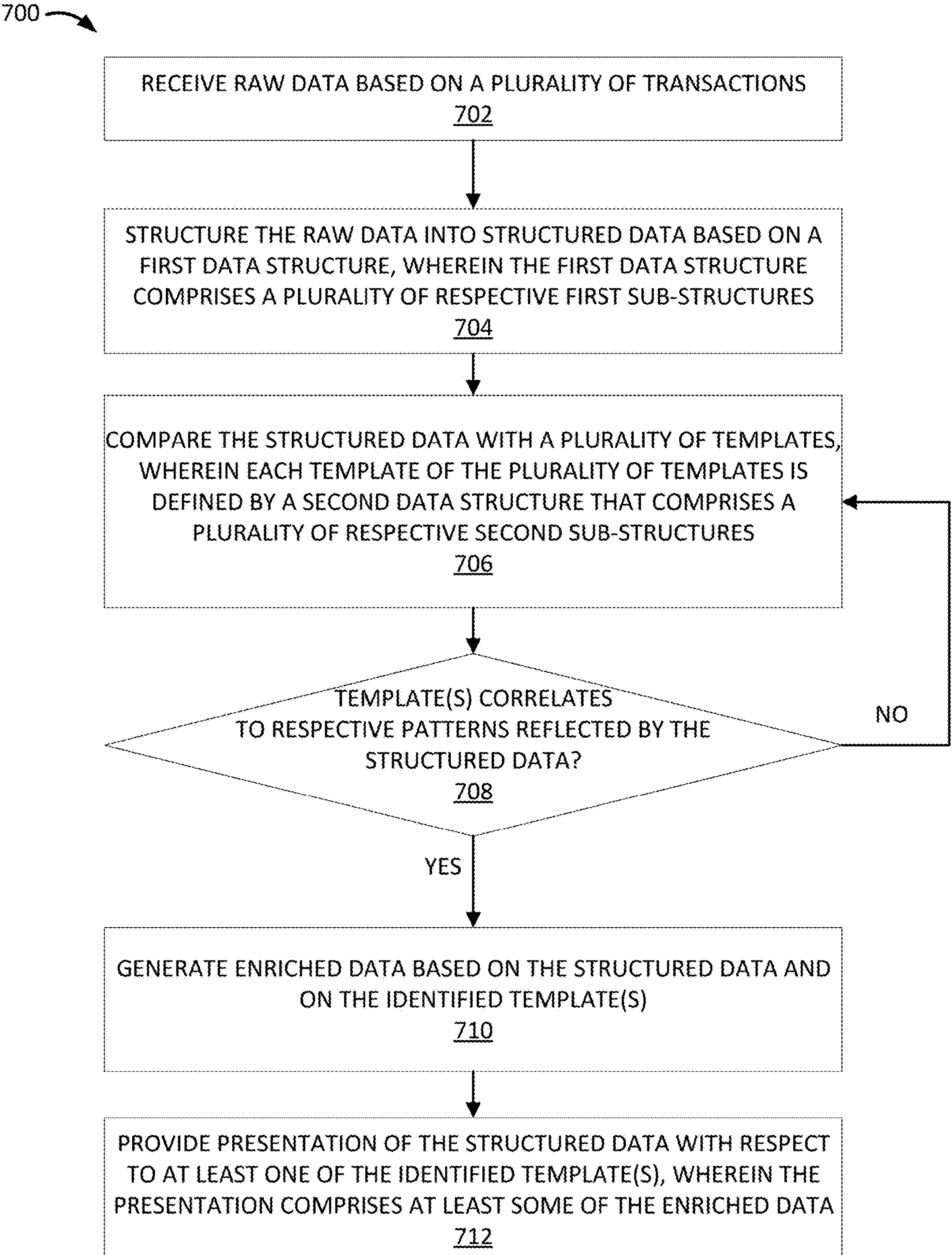
FIG. 7 shows a flowchart of another illustrative process for structuring and analyzing data, in accordance with an embodiment of the disclosure.

FIGS. 5-7 describe flow diagrams of various processes 500-700, respectively. In various embodiments, the individual steps of each process 500-700 may be implemented by one or more components of the devices and systems of FIGS. 1 and 4. Although the present disclosure may describe certain steps of each process 500-700 (and of other processes described herein) as being implemented by certain components of the devices and systems of FIGS. 1 and 4, this is for purposes of illustration only, and it should be understood that other components of the devices and systems of FIGS. 1 and 4 may implement those steps instead. For example, the steps of each process 500-700 may be executed by server 408 and/or by control circuitry 414 of a device 410.

FIG. 5 shows a flowchart of an illustrative process 500 for structuring and analyzing data, in accordance with an embodiment of the disclosure. Example pseudocode associated with example process 500, is shown below, according to some embodiments. It will be understood that FIG. 5 is merely illustrative of one particular way in which data may be structured and analyzed, and that the steps in example process 500 may be applied to any suitable data in any suitable context.

```
1 FUNCTION InferOptionStrategies( )
2 holdings, transactions=LoadActiveHoldingsAndTransactions( )
3 groupedOptions=GroupOptionsByUnderlyingAsset(holdings, transactions)
4
5 final Strategies=[ ]
6
7 FOR EACH underlyingAsset IN groupedOptions:
8 possibleStrategies=InferStrategiesForAsset(underlyingAsset)
9 scoredStrategies=ScoreStrategies(possibleStrategies)
10 optimalStrategies=SelectOptimalStrategies(scoredStrategies)
11 finalStrategies.append(optimal Strategies)
12
13 RETURN finalStrategies
14
15 FUNCTION InferStrategiesForAsset(assetOptions):
16 possibleStrategies=[ ]
17 possibleStrategies.append(PatternMatch(knownStrategies, assetOptions))
18 RETURN possibleStrategies
19.
20 FUNCTION ScoreStrategies(possibleStrategies):
21 scoredStrategies=[ ]
22 FOR EACH strategy IN possibleStrategies:
23 score=0
24 score+=CalculatePrevalenceScore(strategy)
25 score+=CalculatePreferenceScore(strategy)
26 score+=CalculateMetadataScore(strategy)
27 score+=CalculateIntrinsicScore(strategy)
28 scoredStrategies.append((strategy, score))
29 RETURN scoredStrategies
30
31 FUNCTION SelectOptimalStrategies(scoredStrategies):
32 optimal Strategies=[ ]
33 usedOptions=Set( )
34
35 SORT scoredStrategies BY score DESCENDING
36
37 FOR EACH strategy, score IN scoredStrategies:
38 IF NOT ANY option IN strategy.options IS IN usedOptions:
39 optimal Strategies.append(strategy)
40 usedOptions.ADD(strategy.options)
41
42 RETURN optimal Strategies
43
44 FUNCTION PatternMatch(knownStrategies, options):
45 possibleStrategies=[ ]
46 //Returns all possible combinations of options that match the strategy
47 FOR EACH strategy in knownStrategies:
48 //find all option combinations that match the strategy
49 possibleStrategies.ADD(strategy, {option combination})
50 RETURN possibleStrategies
51
52 FUNCTION CalculatePrevalenceScore(strategy):
53 //Calculate score based on overall prevalence of the strategy
54
```

55 FUNCTION CalculatePreferenceScore(strategy):
56 //Calculate score based on past trading behavior
57
58 FUNCTION CalculateMetadataScore(strategy):
59 //Calculate score based on metadata (purchase time, platform, etc.)
60
61 FUNCTION CalculateIntrinsicScore(strategy):
62 //Calculate score based on intrinsic characteristics (spread size, time window, etc.)
63
64 //Main execution
65 result=InferOptionStrategies( )

Referring now to the example process 500, at step 502, control circuitry 414 may receive raw data from one or more different data sources. For instance, control circuitry 414 may load active holdings and transactions associated with an investment portfolio from various sources (e.g., line 2 of the pseudocode). Control circuitry 414 may define one or more particular data structures. Control circuitry 414 may structure the loaded data according to the defined data structure or data structures.

At step 504, control circuitry 414 may group the structured data based on one or more parameters. For instance, control circuitry 414 may group the structured options transactions by the same underlying asset (e.g., line 3 of the pseudocode).

At step 506, control circuitry 414 may detect one or more patterns reflected by the grouped structured data. Based on the detected patterns in the options transactions, control circuitry 414 may generate a list of possible templates that may match with the detected patterns (e.g., lines 15-18 of the pseudocode).

At step 508, control circuitry 414 may score each potential template based on one or more parameters indicative of how closely the template correlates with the pattern reflected by the structure data group (e.g., lines 20-29). For instance, parameters may include prevalence of the template (e.g., as used by other investors or platforms; e.g., lines 52-53 of the pseudocode), user preference for the template (e.g., based on past trading behavior associated with the portfolio; e.g., lines 55-56 of the pseudocode), metadata associated with the template (e.g., purchase time, platform, or other suitable information associated with the template; e.g., lines 58-59 of the pseudocode), intrinsic characteristics of the template (e.g., spread size, time window, or other suitable characteristics associated with the template; e.g., lines 61-62 of the pseudocode), any other suitable parameter, or a combination thereof.

At step 510, control circuitry 414 may sort the strategies by score (e.g., line 35 of the pseudocode) and select the template associated with the highest score. At step 512, control circuitry 414 may remove templates that include variables or attributes that overlap those of another template (e.g., options strategies that include the same options transaction or transactions as with another options strategy; e.g., line 38 of the pseudocode). control circuitry 414 may repeat steps 510 and 512 until one template remains (e.g., lines 31-42 of the pseudocode).

At step 516, control circuitry 414 may return the selected (e.g. optimized) template for display (e.g., lines 7-13 of the pseudocode).

FIG. 6 shows a flowchart of an illustrative process 600 for optimizing template identification for structured data, in accordance with an embodiment of the disclosure. It will be understood that FIG. 6 is merely illustrative of one particular way in which templates may be identified, scored, or analyzed, and that any other suitable techniques for identifying or analyzing templates may be used, and in any suitable context.

At step 602, control circuitry 414 may assign an initial score of zero for each candidate template (e.g., lines 22-23 of the pseudocode). At step 604, control circuitry 414 may assign each template with a score based on its prevalence (e.g., line 24 of the pseudocode). For instance, control circuitry 414 may determine the prevalence based on how common the options strategy is in general. For example, a covered call options strategy may be more frequently used on a platform or by a particular group of investors than would a long condor options strategy. Thus, the covered call may be assigned a score of ten, while the long condor strategy may be assigned a score of one.

At step 606, control circuitry 414 may assign each template with a score based on user preference (e.g., line 25 of the pseudocode). For instance, user preferences may include how often the template was used in association with the particular investment portfolio. For instance, control circuitry 414 may assign a score of ten for the strategy that is most commonly employed by the investor or investment portfolio, and a score of zero for a strategy which the investor or investment portfolio has never used before.

At step 608, control circuitry 414 may assign each template a score based on metadata associated with the template (e.g., line 26 of the pseudocode). For instance, options purchased on the same day, through the same platform, of the same quantity, or a combination thereof, may be more likely to be part of the same options strategy.

At step 610, control circuitry 414 may assign each template a score based on intrinsic characteristics(e.g., intrinsic likelihood) of the template (e.g., line 27 of the pseudocode). For instance, control circuitry 414 may reward templates that are more logical or reasonable in the context of the structured data and penalize templates that are less logical or reasonable. For instance, it may be reasonable or intrinsically likely for three options to be combined into a long call butterfly options strategy. However, if the width (e.g., spread) of the butterfly is a small amount (e.g., $1), then the template is unlikely to correlate with an intention of the trader.

At step 612, for each template, control circuitry 414 may combine the scores into a final score (e.g., a strategy score), to be sorted and optimized.

FIG. 7 shows a flowchart of another illustrative process 700 for structuring and analyzing data, in accordance with an embodiment of the disclosure. At step 702, control circuitry 414 may receive raw data based on a plurality of transactions (for instance, options transactions associated with an investment portfolio). The raw data may be sourced from one or more different sources.

At step 704, control circuitry 414 may structure the raw data into structure data based on a first data structure. The first data structure may define one or more transactions (e.g., options transactions) and may comprise a plurality of first sub-structures. In some embodiments, these first sub-structures comprise an execution date variable, a strike price variable, a spot price variable, a quantity variable, a transaction type variable, any other suitable variable, or a combination thereof.

At step 706, control circuitry 414 may compare the structured data (e.g., the structured options transactions) with a plurality of templates (e.g., options strategies). Each template may be defined by a second data structure comprising a plurality of respective second sub-structures. In some embodiments, these second sub-structures comprise a template type variable and one or more transaction type sub-structures (e.g., corresponding to the first sub-structure). In some embodiments, each transaction type sub-structure comprises a transaction type variable, a quantity type variable, a strike price data variable, any other suitable variable, or a combination thereof.

At step 708, control circuitry 414 may determine whether any of the templates correlate to respective patterns reflected by the structure data. Control circuitry 414 may iterate this step for each template in the plurality of templates. Additionally, or alternatively, control circuitry 414 may dynamically define a template to correlate with a pattern that is detected in the structure data. If control circuitry 414 determines that a template does correlate with the detected pattern, then control circuitry 414 proceeds to step 710. Otherwise, control circuitry 414 continues to compare other templates with the detected pattern until no templates remain.

At step 710, control circuitry 414 may generate enriched data based on the structured data and the identified template or templates. For instance, enriched data may include interpolated data, projection data (e.g., indicating expected performance of the identified templates in the future), performance data (e.g., indicating a performance of respective strategies associated with identified templates), comparative data (e.g., indicating a comparison of strategies associated with the templates), any other suitable inferred data, or a combination thereof.

At step 712, control circuitry 414 may provide for presentation, by way of any suitable UI, the structured data with respect to at least one of the identified templates and at least some of the enriched data.

Throughout the specification, the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting enriched data, the method comprising:

receiving raw data based on a plurality of transactions;

structuring the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

comparing the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identifying one or more templates of the plurality of templates that most likely correlate to respective patterns reflected by the structured data;

generating enriched data based on the structured data and on the identified one or more templates; and providing a first presentation of the structured data with respect to at least one of the identified one or more templates, wherein the first presentation comprises at least some of the enriched data; and providing a second presentation reflecting a strategy associated with another of the plurality of templates different from the at least one of the one or more identified templates.

2. The method of claim 1, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

3. The method of claim 2, wherein the second data structure further comprises one or more functions for generating at least one of the interpolated data, the projection data, the performance data, or the comparative data.

4. The method of claim 1, wherein the second data structure further comprises one or more functions for generating at least some of the enriched data.

5. The method of claim 1, wherein the plurality of second sub-structures further comprises at least one of:

a volatility type variable, a time erosion variable, or a risk variable.

6. The method of claim 1, wherein the one or more transaction type sub-structures further comprises at least one of:

an expiration date variable, an underlying transaction asset variable, a relative strike price variable, or a premium paid variable.

7. A method for presenting enriched data, the method comprising:

receiving raw data based on a plurality of transactions, wherein each of the plurality of transactions is associated with a respective option transaction for an underlying asset;

structuring the raw data into structured data based on a first data structure, the first data structure defining one or more transactions, wherein the first data structure comprises a plurality of respective first sub-structures, wherein the plurality of first sub-structures comprises:

an execution date variable, a strike price variable,
a spot price variable,
a quantity variable, and
a transaction type variable;

comparing the structured data with a plurality of templates, wherein each template of the plurality of templates is defined by a second data structure that comprises a plurality of respective second sub-structures, wherein the plurality of second sub-structures comprises:

a template type variable,
one or more transaction type sub-structures comprising:
a transaction type variable,
a quantity variable, and
a strike price data variable;

identifying one or more templates of the plurality of templates that most likely correlate to respective patterns reflected by the structured data;

generating enriched data based on the structured data and on the identified one or more templates; and providing a presentation of the structured data with respect to at least one of the identified one or more templates, wherein the presentation comprises at least some of the enriched data.

8. The method of claim 7, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

9. The method of claim 8, wherein the second data structure further comprises one or more functions for generating at least one of the interpolated data, the projection data, the performance data, or the comparative data.

10. The method of claim 7, wherein the second data structure further comprises one or more functions for generating at least some of the enriched data.

11. A method for presenting enriched data, the method comprising:

receiving raw data based on a plurality of transactions;

structuring the raw data into structured data based on a first data structure, the first data structure defining one or more transactions, wherein the first data structure comprises a plurality of respective first sub-structures, wherein the plurality of first sub-structures comprises:

an execution date variable,
a strike price variable,
a spot price variable,
a quantity variable, and
a transaction type variable;

comparing the structured data with a plurality of templates, wherein each template of the plurality of templates is defined by a second data structure that comprises a plurality of respective second sub-structures, wherein the plurality of second sub-structures comprises:

a template type variable,
one or more transaction type sub-structures comprising:
a transaction type variable,
a quantity variable, and
a strike price data variable;

identifying one or more templates of the plurality of templates that most likely correlate to respective patterns reflected by the structured data, wherein each of the identified one or more templates is associated with a respective option position strategy;

generating enriched data based on the structured data and on the identified one or more templates; and providing a presentation of the structured data with respect to at least one of the identified one or more templates, wherein the presentation comprises at least some of the enriched data.

12. The method of claim 11, wherein each of the one or more transaction type sub-structures for each of the identified one or more templates corresponds to a respective option transaction, wherein each of the option transactions is associated with an underlying asset.

13. The method of claim 11, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

14. The method of claim 13, wherein the second data structure further comprises one or more functions for generating at least one of the interpolated data, the projection data, the performance data, or the comparative data.

15. The method of claim 11, wherein the second data structure further comprises one or more functions for generating at least some of the enriched data.

16. A system for presenting enriched data, the system comprising:

input/output circuitry configured to:
receive raw data based on a plurality of transactions;

control circuitry configured to:

structure the raw data into structured data based on a first data structure, the first data structure defining one or more transactions, wherein the first data structure comprises a plurality of respective first sub-structures, wherein the plurality of first sub-structures comprises:

an execution date variable,
a strike price variable,
a spot price variable,
a quantity variable, and
a transaction type variable;

compare the structured data with a plurality of templates, wherein each template of the plurality of templates is defined by a second data structure that comprises a plurality of respective second sub-structures, wherein the plurality of second sub-structures comprises:

a template type variable,
one or more transaction type sub-structures comprising:
a transaction type variable,
a quantity variable, and
a strike price data variable;

identify one or more templates of the plurality of templates that most likely correlate to respective patterns reflected by the structured data; and generate enriched data based on the structured data and on the identified one or more templates; and wherein the input/output circuitry is further configured to:

provide a first presentation of the structured data with respect to at least one of the identified one or more templates, wherein the first presentation comprises at least some of the enriched data; and provide a second presentation reflecting a strategy associated with another of the plurality of templates different from the at least one of the one or more identified templates.

17. The system of claim 16, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

18. The system of claim 17, wherein the second data structure further comprises one or more functions for generating at least one of the interpolated data, the projection data, the performance data, or the comparative data.

19. The system of claim 16, wherein the second data structure further comprises one or more functions for generating at least some of the enriched data.

20. The system of claim 16, wherein the plurality of second sub-structures further comprises at least one of:

a volatility type variable, a time erosion variable, or a risk variable.

21. The system of claim 16, wherein the one or more transaction type sub-structures further comprises at least one of:

an expiration date variable, an underlying transaction asset variable, a relative strike price variable, or a premium paid variable.

22. A system for presenting enriched data, the system comprising:

input/output circuitry configured to:

receive raw data based on a plurality of transactions, wherein each of the plurality of transactions is associated with a respective option transaction for an underlying asset;

control circuitry configured to:

structure the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

compare the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identify one or more templates of the plurality of templates that most likely correlate to respective patterns reflected by the structured data; and generate enriched data based on the structured data and on the identified one or more templates; and wherein the input/output circuitry is further configured to:

provide a presentation of the structured data with respect to at least one of the identified one or more templates, wherein the presentation comprises at least some of the enriched data.

23. The system of claim 22, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

24. The system of claim 23, wherein the second data structure further comprises one or more functions for generating at least one of the interpolated data, the projection data, the performance data, or the comparative data.

25. The system of claim 22, wherein the second data structure further comprises one or more functions for generating at least some of the enriched data.

26. A system for presenting enriched data, the system comprising:

input/output circuitry configured to:

receive raw data based on a plurality of transactions;

control circuitry configured to:

structure the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

compare the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identify one or more templates of the plurality of templates that most likely correlate to respective patterns reflected by the structured data, wherein each of the identified one or more templates is associated with a respective option position strategy; and generate enriched data based on the structured data and on the identified one or more templates; and wherein the input/output circuitry is further configured to:

provide a presentation of the structured data with respect to at least one of the identified one or more templates, wherein the presentation comprises at least some of the enriched data.

27. The system of claim 26, wherein each of the one or more transaction type sub-structures for each of the identified one or more templates corresponds to a respective option transaction, wherein each of the option transactions is associated with an underlying asset.

28. The system of claim 26, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

29. The system of claim 28, wherein the second data structure further comprises one or more functions for generating at least one of the interpolated data, the projection data, the performance data, or the comparative data.

30. The system of claim 26, wherein the second data structure further comprises one or more functions for generating at least some of the enriched data.

31. A non-transitory computer-readable medium having instructions encoded thereon for presenting enriched data, wherein the instructions, when executed by control circuitry, cause the control circuitry to:

receive raw data based on a plurality of transactions;

structure the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

compare the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identify one or more templates of the plurality of templates that most likely correlate to respective patterns reflected by the structured data;

generate enriched data based on the structured data and on the identified one or more templates;

provide a first presentation of the structured data with respect to at least one of the identified one or more templates, wherein the first presentation comprises at least some of the enriched data; and provide a second presentation reflecting a strategy associated with another of the plurality of templates different from the at least one of the one or more identified templates.

32. The non-transitory computer-readable medium of claim 31, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

33. The non-transitory computer-readable medium of claim 32, wherein the second data structure further comprises one or more functions for generating at least one of the interpolated data, the projection data, the performance data, or the comparative data.

34. The non-transitory computer-readable medium of claim 31, wherein the second data structure further comprises one or more functions for generating at least some of the enriched data.

35. The non-transitory computer-readable medium of claim 31, wherein the plurality of second sub-structures further comprises at least one of:

a volatility type variable, a time erosion variable, or a risk variable.

36. The non-transitory computer-readable medium of claim 31, wherein the one or more transaction type sub-structures further comprises at least one of:

an expiration date variable, an underlying transaction asset variable, a relative strike price variable, or a premium paid variable.

37. A non-transitory computer-readable medium having instructions encoded thereon for presenting enriched data, wherein the instructions, when executed by control circuitry, cause the control circuitry to:

receive raw data based on a plurality of transactions, wherein each of the plurality of transactions is associated with a respective option transaction for an underlying asset;

structure the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

compare the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identify one or more templates of the plurality of templates that most likely correlate to respective patterns reflected by the structured data;

generate enriched data based on the structured data and on the identified one or more templates; and provide a presentation of the structured data with respect to at least one of the identified one or more templates, wherein the presentation comprises at least some of the enriched data.

38. The non-transitory computer-readable medium of claim 37, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

39. The non-transitory computer-readable medium of claim 38, wherein the second data structure further comprises one or more functions for generating at least one of the interpolated data, the projection data, the performance data, or the comparative data.

40. The non-transitory computer-readable medium of claim 37, wherein the second data structure further comprises one or more functions for generating at least some of the enriched data.

41. A non-transitory computer-readable medium having instructions encoded thereon for presenting enriched data, wherein the instructions, when executed by control circuitry, cause the control circuitry to:

receive raw data based on a plurality of transactions;

structure the raw data into structured data based on a first data structure, the first data structure defining one or more transactions, wherein the first data structure comprises a plurality of respective first sub-structures, wherein the plurality of first sub-structures comprises:

an execution date variable, a strike price variable, a spot price variable, a quantity variable, and a transaction type variable;

compare the structured data with a plurality of templates, wherein each template of the plurality of templates is defined by a second data structure that comprises a plurality of respective second sub-structures, wherein the plurality of second sub-structures comprises:

a template type variable, one or more transaction type sub-structures comprising:

a transaction type variable, a quantity variable, and a strike price data variable;

identify one or more templates of the plurality of templates that most likely correlate to respective patterns reflected by the structured data, wherein each of the identified one or more templates is associated with a respective option position strategy;

generate enriched data based on the structured data and on the identified one or more templates; and provide a presentation of the structured data with respect to at least one of the identified one or more templates, wherein the presentation comprises at least some of the enriched data.

42. The non-transitory computer-readable medium of claim 41, wherein each of the one or more transaction type sub-structures for each of the identified one or more templates corresponds to a respective option transaction, wherein each of the option transactions is associated with an underlying asset.

43. The non-transitory computer-readable medium of claim 41, wherein the enriched data comprises at least one of: interpolated data; projection data indicating expected performance of the identified one or more templates in the future; performance data indicating a performance of respective strategies associated with at least one of the identified one or more templates; or comparative data indicating a comparison of strategies associated with templates of the plurality of templates.

44. The non-transitory computer-readable medium of claim 43, wherein the second data structure further comprises one or more functions for generating at least one of the interpolated data, the projection data, the performance data, or the comparative data.

45. The non-transitory computer-readable medium of claim 41, wherein the second data structure further comprises one or more functions for generating at least some of the enriched data.

* * * * *